United States Patent [19]

Dvorachek

[11] 4,307,272

[45] Dec. 22, 1981

[54] PRESSURE ACTUATED SWITCH

[75] Inventor: Harold A. Dvorachek, Iola, Kans.

[73] Assignee: The Echlin Manufacturing Company, Branford, Conn.

[21] Appl. No.: 13,157

[22] Filed: Feb. 21, 1979

[51] Int. Cl.[3] .............................................. A01K 35/34

[52] U.S. Cl. ................................. 200/83 P; 200/83 Q

[58] Field of Search ................. 200/83 N, 83 P, 83 Q, 200/83 R, 67 D, 67 DB, 243, 250, 290

[56] References Cited

U.S. PATENT DOCUMENTS

| | | | |
|---|---|---|---|
| 2,754,388 | 7/1956 | Beeman | 200/83 P |
| 3,240,895 | 3/1966 | Horowitz | 200/83 P |
| 3,917,917 | 11/1975 | Murata | 200/83 N |

*Primary Examiner*—Gerald P. Tolin

*Attorney, Agent, or Firm*—Neuman, Williams, Anderson & Olson

[57] ABSTRACT

A pressure actuated switch is provided in which one face of a diaphragm engages a metal contact plate which has a pair of integral contact areas thereon or a pair of contacts fused thereto for engagement with contacts on the ends of a pair of terminal posts molded in a plastic housing part. The contact plate also has a central deformation disposed between the contacts thereon and engaged with a spring metal strip of arcuate cross-sectional configuration, one or more additional strips being optionally provided.

16 Claims, 5 Drawing Figures

FIG. 1
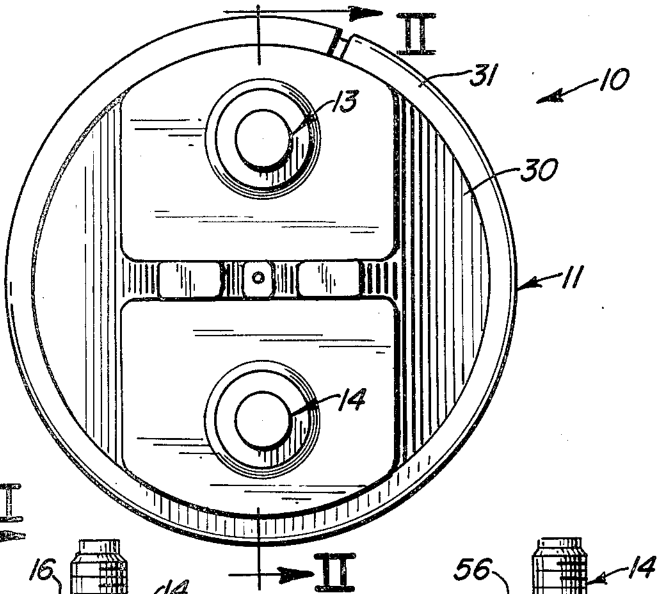
FIG. 2
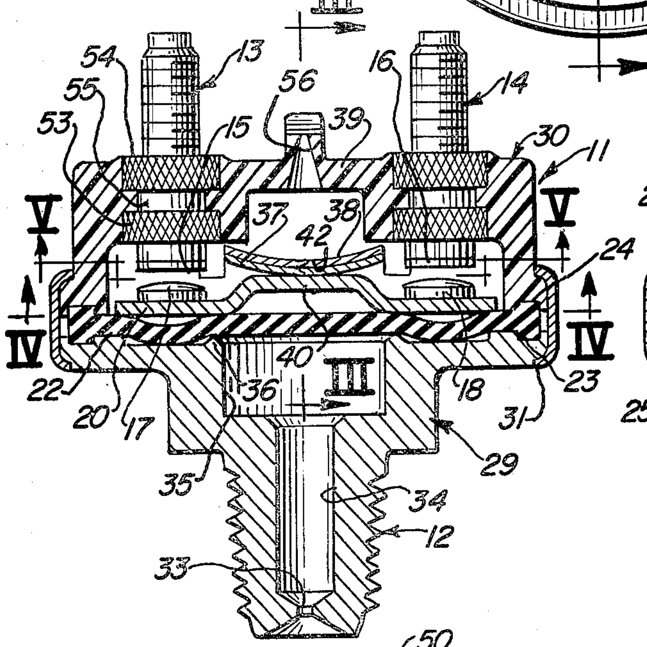
FIG. 3
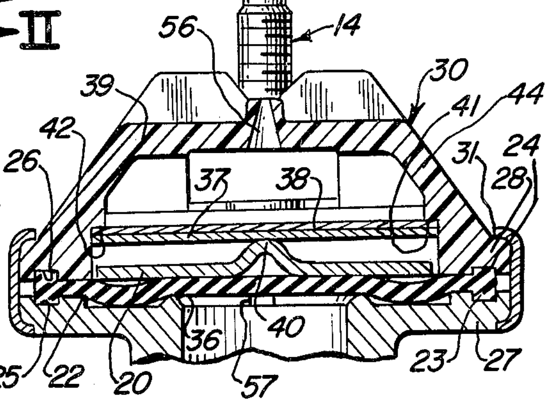
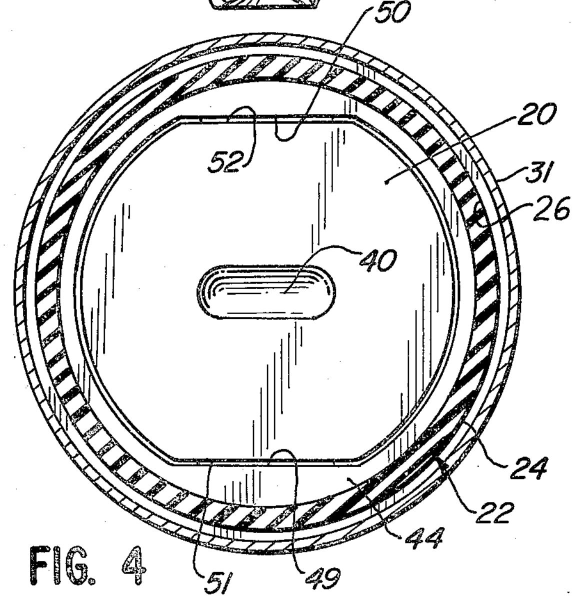
FIG. 4
FIG. 5
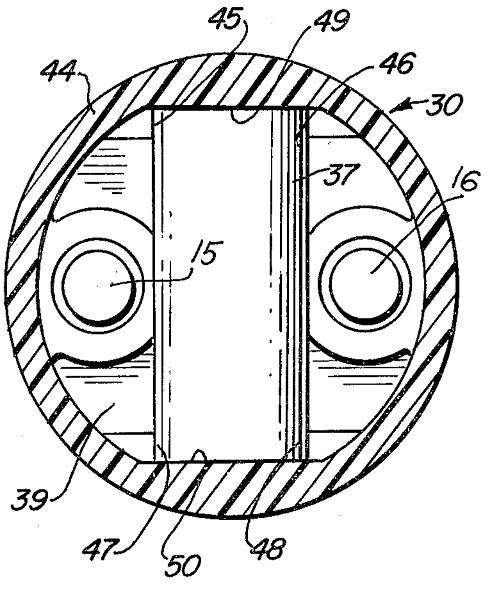

PRESSURE ACTUATED SWITCH

BACKGROUND OF THE INVENTION

This invention relates to a pressure actuated switch and more particularly to a pressure actuated switch which is constructed in a relatively simple manner, using few component parts and being economically manufacturable, while being rugged and durable, and reliable in operation.

Pressure actuated switches of various types have been employed in numerous applications where the pressure condition of a pressure source or line must be converted to an electrical signal. Exemplary of existing pressure switches are those disclosed in the following patents: U.S. Pat. No. 2,928,913 issued to H. L. Dobrikin on Mar. 15, 1960; U.S. Pat. No. 2,935,581 issued to H. L. Dobrikin on May 3, 1960; U.S. Pat. No. 3,093,716 issued to C. Horowitz on June 11, 1963; U.S. Pat. No. 3,177,313 issued to B. Klimek on Apr. 6, 1965; U.S. Pat. No. 3,240,895 issued to C. Horowitz and B. Klimek on Mar. 15, 1966; U.S. Pat. No. 3,519,773 issued to B. Klimek on July 7, 1970; and U.S. Pat. No. 3,529,107 issued to H. L. Dobrikin on Sept. 15, 1970.

Pressure switches which operate with a "snap action" are especially useful due to their inherent insensitivity to vibration and switch chatter. A switch having such snap action characteristic and being advantageously formed for improved reliability, and ease and economy of manufacture is particularly useful.

Accordingly, it is an object of this invention to provide an improved pressure actuated switch.

It is a further object of this invention to provide a pressure actuated snap action switch of advantageous design achieving improved reliability, and ease and economy of manufacture.

In an illustrative embodiment of this invention, a pressure actuated switch is provided which has a relatively simplified construction in an advantageously formed housing having a cavity therein. A metal contact plate within such cavity has a central portion engaged with an operative portion of a spring, preferably comprising a strip of spring metal supported at its opposite ends. In the preferred embodiment a pair of contacts on the surface of the metal contact plate and, electrically interconnected by such plate, are engagable with a pair of otherwise electrically insulated contacts which are supported from an end wall of the housing. Under the influence of pressure applied through a port to a diaphragm in the housing, the contact plate is moved in opposition to the spring means to bring the contact areas or contacts of the contact plate into electrical contact with the contacts on the housing.

This invention contemplates other objects, features and advantages which will become more fully apparent from the following detailed description taken in conjunction with the accompanying drawings.

BRIEF DESCRIPTION OF THE DRAWINGS

FIG. 1 is a top plan view of a pressure actuated switch constructed in accordance with the invention;

FIG. 2 is a sectional view taken substantially along line II—II of FIG. 1;

FIG. 3 is a sectional view of a portion of the device taken substantially along line III—III of FIG. 2;

FIG. 4 is a sectional view taken substantially along line IV—IV of FIG. 2; and FIG. 5 is a sectional view taken substantially along line V—V of FIG. 2.

DESCRIPTION OF A PREFERRED EMBODIMENT

In the drawings reference numeral 10 generally designates a pressure actuated switch constructed in accordance with the principles of this invention. The illustrated switch 10 includes a housing 11 which includes an externally threaded portion 12 arranged to be coupled to a fluid pressure source. In the preferred embodiment, the housing further includes a pair of electrical terminal posts 13 and 14 projecting from the housing 11 and arranged for connection in an electrical circuit. In the operation of the device as illustrated, when the pressure supplied to the device exceeds a certain value, contacting means are operated within the device to electrically connect the terminal posts 13 and 14. The device has many applications but, for example, may be used in pneumatic braking systems and in energizing signal lights at the rear of a truck or other vehicle to indicate that the brakes of the vehicle are being applied.

The terminal posts 13 and 14 are formed with contacts 15 and 16 at their lower ends or as an integral part thereof, contacts 15 and 16 being engagable by a pair of contacts 17 and 18 on a contact plate 20. The plate 20 is a metal plate and the contacts 17 and 18 may be fused thereto, as by brazing or welding; alternately, the contacts 17 and 18 may be areas formed integrally in the plate 20 and need not extend above the upper surface of the plate. The contacts 17 and 18 are thus electrically interconnected through the plate 20 so as to electrically interconnect the terminal posts 13 and 14 when the contacts 17 and 18 are engaged with the contacts 15 and 16.

The contact plate 20 engages one face of a diaphragm 22 which is formed with peripheral beads 23 and 24 engaged in facing annular grooves 25 and 26 in rim portions 27 and 28 of lower and upper housing members 29 and 30. The lower housing member 29 is preferably of metal, such as zinc, while the upper housing member 30 is formed of a plastic or other moldable, insulating compound such as GE VALOX 420. The rim portions 27 and 28 are secured together by a crimped ring 31.

The lower housing member 29 is formed preferably with the externally threaded portion 12. Fluid under pressure may enter through a small diameter opening 33 at the end of the portion 12. A communicating passage 34 in the portion 12 extends to a larger diameter portion 35 which terminates in an annular valve seat 36 on an upper face of the lower housing portion 29. The valve seat 36 is disposed around the upper end of the portion 12 and sealingly engages the lower face of the diaphragm 22 when the diaphragm is in the position shown in FIG. 2.

The contact plate 20 and the diaphragm 22 are urged to such position as illustrated in FIG. 2 by spring means including a pair of generally rectangular strips 37 and 38 of spring metal disposed within the upper housing member 30 between an end portion 39 thereof and the contact plate 20. Each of the strips 37 and 38 has an arcuate transverse cross-sectional configuration. A center point of the lower strip 37 is engaged by a central portion 40 of the contact plate 20. The opposite ends of the upper strip 38 are engaged with downwardly facing surfaces 41 and 42 of the upper housing member 30.

The central portion 40 of the contact plate 20 is preferably formed as an integral deformation or projection thereof, projecting upwardly toward the end portion 39. The portion 40 is elongated in a direction in transverse relation to the spring strips 37 and 38.

Important specific features of the invention relate to the formation of internal surfaces in the housing member 30 for guiding and supporting the contact plate 20 and spring metal strips 37 and 38, and also permitting ready assembly of the switch 10. The housing member 30 has a peripheral side wall 44 from which the surfaces 41 and 42 project as shoulder formations. The surfaces 41 and 42 preferably have an arcuate shape corresponding to the arcuate cross-sectional configuration of the spring metal strips 37 and 38. The side wall 44 is also formed with projecting surface portions 45, 46, 47, and 48 which engage side edge portions of the strips 37 and 38 at the opposite ends thereof, preventing sidewise movement thereof. In addition, the side wall 44 is formed with surface portions 49 and 50 which are in parallel planes adjacent the opposite ends of the strips 37 and 38 and also adjacent edge portions 51 and 52 of the contact plate 20. It is noted that the periphery of the contact plate 20 is substantially circular, except for the edge portions 51 and 52 which extend along parallel opposed chordal lines.

With this arrangement, the switch 10 may be readily and accurately assembled and the contact plate 20 is properly guided for movement while not permitting the diaphragm 22 to be pinched between the contact plate and the upper housing member 30.

The upper housing member 30 may be molded of a plastic material and the terminal posts 13 and 14 may be locked in position during molding of the upper housing portion 30. Thus, the contact post 13 may have larger diameter knurled portions 53 and 54 separated by a smaller diameter portion 55, and terminal post 14 may have the same construction. An opening 56 may be provided in the end wall 39 of the upper housing member 30, to vent the end portion 39 of the housing member 30 to atmospheric pressure.

In operation, fluid enters through the opening 33 into the space defined by passages 34 and 35 and develops pressure against the center portion of the diaphragm 22 within the valve seat 36. It should be noted that a pair of small channels or slots 57 (FIG. 3) diametrically opposing one another in the seat 36 may be provided to ensure that the diaphragm 22 and seat 36 do not make a complete seal when only low pressure is applied at opening 33. Ultimately, when sufficient force is applied to the diaphragm by the fluid pressure, the spring metal strips 37 and 38 are deformed.

More particularly, as pressure builds, central portions of the strips 37 and 38 are flattened until, at a predetermined pressure, such central portions have been substantially flattened; once so flattened, an elastic bending action takes place in the metal strips which thereafter requires the application of considerably less incremental force to effect displacement. Also, when the diaphragm 22 is lifted off the valve seat 36 by the rapid application of substantial pressure, the effective active diaphragm area may be substantially increased and the force, developed by the fluid under pressure, increased as well. As a result of such actions at such predetermined pressure, the contact plate 20 is rapidly moved upwardly to engage the contacts 17 and 18 with the contacts 15 and 16. A "snap action" is obtained which is highly desirable in obtaining a reliable switching action. When pressure is released the contact plate returns to the position shown in FIG. 2, under the aegis of the spring metal strips 37 and 38 as they elastically return to the position shown.

While the above specification has described this invention in terms of an illustrative embodiment, it should be understood that the invention is not limited to that embodiment. Rather the invention encompasses that which falls within the scope and spirit of the following claims.

What is claimed is:

1. In a fluid actuated switch, the combination comprising:

a housing including a cavity, a port in communication with said cavity, and a first contact member within said cavity;

first means disposed for reciprocal movement within said cavity, said first means including an electrically conductive contact plate having first and second contiguous portions, said first portion including projection means and said second portion including first contact means;

spring means mounted in said housing engaging said projection means and predisposing said contact plate to a first position in said cavity;

said first means including means, responsive to pressure of a predetermined magnitude applied at said port, for cooperatively operating with said spring means to move said contact plate to a second position in said cavity;

said first contact member and said first contact means being mutually positioned to engage each other in electrical contact when said contact plate is in a predetermined one of said first and second positions and to be electrically insulated from each other when said contact plate is in the other of said first and second positions, said first contact means and said projection means being disposed on the same side of said contact plate, and said first contact member and said first contact means being in electrical contact when said contact plate is in said second position, said spring means being of generally elongated rectangular form with opposite side edges along parallel lines and with a uniform arcuate transverse cross section.

2. A combination as in claim 1 wherein said housing includes a second contact member within said cavity and said contact plate has a second contact means, said first and second contact means being in electrical contact with one another by means of said contact plate, and said second contact member and said second contact means being mutually positioned to engage each other in electrical contact when said contact plate is in said second position.

3. A combination as in claim 1 wherein said first means includes a diaphragm disposed between said port and said contact plate; and said housing includes a passage communicating with said cavity from said port and terminating in said housing with an annular valve seat adapted for sealingly engaging said diaphragm when said contact plate is in said first position, whereby, in such position, only a predetermined portion of said diaphragm is exposed to pressure applied at said port.

4. In a pressure actuated switch, a flexible diaphragm, housing means including means in sealing engagement with a peripheral edge portion of said diaphragm and including an end wall in spaced facing relation to one face of said diaphragm, spring means supported from said end wall and having an operative portion in facing relation to a central portion of said diaphragm, said operative portion being resiliently movable toward said end wall against the action of said spring means, a metal contact plate having a central portion engaged with said operative portion of said spring means and having one surface engaged with said one face of said diaphragm, a first pair of contacts on an opposite surface of said metal contact plate substantially displaced from said central portion, and a second pair of contacts supported from said end wall of said housing means for engagement by said first pair of contacts when the force exerted by said spring means combined with the force exerted from fluid pressure against said contact plate and said one face of said diaphragm is less than the force exerted from fluid pressure against the opposite face of said diaphragm.

5. In a switch as defined in claim 4, said spring means including a strip of spring metal having a center portion defining said operative portion of said spring means, and means for supporting opposite end portions of said spring metal strip from said housing means.

6. In a switch as defined in claim 5, said central portion of said contact plate being formed by an integral deformation thereof projecting toward said end wall into engagement with said center portion of said spring metal strip.

7. In a switch as defined in claim 5, said second pair of contacts being disposed on opposite sides of said spring metal strip.

8. In a switch as defined in claim 5, said spring metal strip having an arcuate transverse cross-sectional configuration with said center portion being initially flattened and then deflected relative to said opposite end portions with an accelerated snap action in response to a force applied from said central portion of said contact plate, to rapidly effect engagement of said first pair of contacts with said second pair of contacts.

9. In a switch as defined in claim 8, said spring means further including at least one additional strip of spring metal of substantially the same size and shape as the first-mentioned strip of spring metal and arranged to increase the force required to obtain a switching operation while also obtaining said snap action.

10. In a switch as defined in claim 4, said first pair of contacts being in the form of members fused to said contact plate.

11. In a switch as defined in claim 4, said first pair of contacts being formed integrally in said contact plate.

12. In a switch as defined in claim 4, said housing means including a peripheral side wall between the periphery of said diaphragm and the periphery of said end wall, said peripheral side wall having an inner surface in closely spaced guiding relation to the peripheral edge of said metal contact plate.

13. In a switch as defined in claim 12, said spring means including a strip of spring metal having a center portion defining said operative portion of said spring means, said peripheral side wall of said housing means including first and second projecting surface portions for engaging and supporting opposite ends of said spring metal strip.

14. In a switch as defined in claim 13, said peripheral side wall further including projecting surface portions engaging opposite side edges of said strip at each end thereof to prevent sidewise movement thereof.

15. In a switch as defined in claim 14, said strip of spring metal being generally rectangular and having end edges in parallel planes in transverse relation to said diaphragm, said contact plate having edge portions approximately in said planes, and said peripheral side wall having surface portions in closely adjacent relation to said edge portions of said contact plates and to said end edges of said spring metal strip.

16. In a switch as defined in claim 4, said diaphragm having a first peripheral bead on said one face thereof and a second peripheral bead on the opposite face thereof substantially aligned with said first peripheral bead, said housing means comprising a pair of members having facing rim portions formed with annular aligned grooves sealingly receiving said first and second peripheral beads of said diaphragm, and means around said rim portions for clamping the periphery of said diaphragm therebetween.

* * * * *